United States Patent
Tokuda et al.

(10) Patent No.: US 12,172,409 B2
(45) Date of Patent: Dec. 24, 2024

(54) LAMINATE OF INORGANIC SUBSTRATE/POLYMER FILM LAYER WITH ATTACHED PROTECTIVE FILM, LAMINATE STACK, LAMINATE STORAGE METHOD, AND LAMINATE TRANSPORT METHOD

(71) Applicant: TOYOBO CO., LTD., Osaka (JP)

(72) Inventors: Kaya Tokuda, Otsu (JP); Satoshi Maeda, Otsu (JP); Tetsuo Okuyama, Otsu (JP); Naoki Watanabe, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 18/263,953

(22) PCT Filed: Feb. 22, 2022

(86) PCT No.: PCT/JP2022/007249
§ 371 (c)(1),
(2) Date: Aug. 2, 2023

(87) PCT Pub. No.: WO2022/186002
PCT Pub. Date: Sep. 9, 2022

(65) Prior Publication Data
US 2024/0116274 A1 Apr. 11, 2024

(30) Foreign Application Priority Data
Mar. 4, 2021 (JP) .................. 2021-034770

(51) Int. Cl.
*B32B 7/12* (2006.01)
*B32B 17/10* (2006.01)
(Continued)

(52) U.S. Cl.
CPC ............... *B32B 17/10* (2013.01); *B32B 7/12* (2013.01); *B32B 27/08* (2013.01); *B32B 27/281* (2013.01);
(Continued)

(58) Field of Classification Search
CPC ....................................... B32B 7/12
See application file for complete search history.

(56) References Cited

U.S. PATENT DOCUMENTS 8,906,515 B2   12/2014   Tomantschger et al.

FOREIGN PATENT DOCUMENTS

EP   2380732 B1   2/2019
JP   2000-347181 A   12/2000
(Continued)

OTHER PUBLICATIONS

Japan Patent Office, International Search Report in International Patent Application No. PCT/JP2022/007249 (May 17, 2022).
(Continued)

*Primary Examiner* — Elizabeth E Mulvaney
(74) *Attorney, Agent, or Firm* — Leydig, Voit & Mayer, Ltd.

(57) ABSTRACT

An inorganic substrate/polymer film laminate with an attached protective film that allows for easy individual removal even when stored in a stacked state for a long period of time is provided. A first laminate is characterized by including an inorganic substrate, a polymer film layer and a first protective film, in that order, wherein the surface roughness Ra of the surface of the inorganic substrate opposite of the polymer film layer is 0.02-1.2 μm.

17 Claims, 3 Drawing Sheets

(51) Int. Cl.
  *B32B 27/08* (2006.01)
  *B32B 27/28* (2006.01)
  *B32B 27/32* (2006.01)
  *B32B 27/36* (2006.01)
(52) U.S. Cl.
  CPC .............. *B32B 27/32* (2013.01); *B32B 27/36* (2013.01); *B32B 2307/538* (2013.01); *B32B 2457/00* (2013.01)

(56) References Cited

FOREIGN PATENT DOCUMENTS

| | | |
|---|---|---|
| JP | 2011-140187 A | 7/2011 |
| JP | 5152104 B2 | 2/2013 |
| JP | 5699606 B2 | 4/2015 |
| JP | 2017-141133 A | 8/2017 |
| JP | 2019-046702 A | 3/2019 |
| JP | 2020-052221 A | 4/2020 |
| JP | 2020-199766 A | 12/2020 |
| JP | 2021-000802 A | 1/2021 |
| WO | WO 2021/199798 A1 | 10/2021 |

OTHER PUBLICATIONS

Japan Patent Office, Written Opinion of the International Searching Authority in International Patent Application No. PCT/JP2022/007249 (Apr. 27, 2022).
European Patent Office, Extended European Search Report in European Patent Application No. 22763058.9 (Jun. 21, 2024).

LAMINATE OF INORGANIC SUBSTRATE/POLYMER FILM LAYER WITH ATTACHED PROTECTIVE FILM, LAMINATE STACK, LAMINATE STORAGE METHOD, AND LAMINATE TRANSPORT METHOD

TECHNICAL FIELD

The present invention relates to a storage form, a storage method, and a transport method of a laminate including an inorganic substrate and a polymer film layer.

BACKGROUND ART

The use of polymer films such as polyimide as a substrate material for manufacturing flexible electronic devices has been studied. Since these polymer films such as polyimide are manufactured in long roll shapes, it is generally accepted that a roll-to-roll manufacturing line is ideal for the manufacture of flexible devices as well.

Meanwhile, in a large number of conventional electronic devices such as display devices, sensor arrays, touch screens and printed wiring boards, hard and rigid substrates such as glass substrates, semiconductor wafers, or glass fiber reinforced epoxy substrates are used, and the manufacturing equipment is also configured on the premise of using such rigid substrates.

Based on this background, as a technique of manufacturing flexible electronic devices using existing manufacturing equipment, there are known techniques of manufacturing flexible electronic devices in the procedure of handling a polymer film in a state of being temporarily pasted to a rigid inorganic substrate such as a glass substrate used as a temporary support, processing an electronic device on the polymer film, and then peeling off the polymer film on which the electronic device is formed from the temporary support. (Patent Document 1)

As a technique of manufacturing flexible electronic devices using existing manufacturing equipment, there are known techniques of manufacturing flexible electronic devices by applying a polymer solution or a polymer precursor solution to a rigid substrate such as a glass substrate used as a temporary support, and drying the solution to form a precursor film, then converting the precursor into a polymer film by causing a chemical reaction to obtain a laminate of a temporary support and a polymer film, forming an electronic device on the polymer film in the same manner, and then peeling off the polymer film. (Patent Document 2)

However, in the process of forming a desired functional element on a laminate in which a polymer film and a support formed of an inorganic substance are bonded together, the laminate is often exposed to a high temperature. For example, in the formation of functional elements such as polysilicon and oxide semiconductors, a step performed in a temperature region of about 200° C. to 600° C. is required. A temperature of about 200° C. to 300° C. may be applied to the film in the fabrication of a hydrogenated amorphous silicon thin film, and further heating at about 450° C. to 600° C. may be required in order to heat and dehydrogenate amorphous silicon and obtain low-temperature polysilicon. Hence, the polymer film constituting the laminate is required to exhibit heat resistance, but as a matter of fact, polymer films which can withstand practical use in such a high temperature region are limited, and polyimide is selected in many cases.

In other words, in any technique, a laminate in a state where a rigid temporary support and a polymer film layer that is finally peeled off and becomes the substrate of a flexible electronic device are superimposed one on the other is used. The laminate can be handled as a rigid plate material, and can be thus handled in the same manner as a glass substrate in equipment for manufacturing liquid crystal displays, plasma displays, organic EL displays, or the like using conventional glass substrates.

PRIOR ART DOCUMENTS

Patent Documents

Patent Document 1: JP-B-5152104
Patent Document 2: JP-B-5699606

SUMMARY OF THE INVENTION

Problems to be Solved by the Invention

The subject of the present invention is the storage form, storage method, and transport method of a laminate including the polymer film and rigid temporary support described above.

Conventional rigid inorganic substrates such as glass substrates are handled in the form of stacks of multiple substrates during storage or transportation. When stacked, a cushioning material such as a foamed polymer sheet or paper is sandwiched between the inorganic substrates so that the inorganic substrates are easily taken out from the stack after storage or transportation. The method is adoptable to glass substrates having sufficient surface hardness. However, in the laminate of an inorganic substrate (temporary supporting substrate) and a polymer film handled by the present invention, since the surface hardness of the polymer film is insufficient, the polymer film surface and the inorganic substrate surface of the laminate are rubbed against each other and the soft polymer film surface is damaged when the laminate is stacked. Furthermore, in a case where a cushioning material such as a foamed polymer sheet or paper is used as well, the polymer film surface is likely to be damaged by foreign matter that is mixed in.

A commonly used method for solving such problems is a technique of protecting the polymer film surface with a protective film. Generally, the protective film is slightly pressure sensitive adhesive films in which pressure sensitive adhesive materials exhibiting weak adhesive properties are applied to one surface of relatively inexpensive polymer films such as polyethylene, polypropylene, and polyester. By using the protective films, it is possible to prevent the polymer film surface from being damaged and to maintain a polymer film surface suitable for the formation of fine flexible electronic device.

However, the present inventors have faced a problem that the protective film surface and the inorganic substrate surface stick to each other and this makes it difficult to take out the laminates individually in a case where a plurality of laminates with attached protective film in which a protective film is pasted to the polymer film surface of the laminate are superposed one on another and stored or transported. It is also possible to use cushioning materials such as foamed polymer sheet and paper concurrently as with glass substrates, but the use of cushioning materials is not a preferred method since secondary materials are used in addition to the protective film and this leads to an increase in cost as well as an increase in waste.

In a case where a laminate is manufactured by applying a polymer solution or a polymer precursor solution to an inorganic substrate and converting the solution into a polymer film, the laminate manufacturing process is a batch process, but it is preferable to form a continuous sheet in which laminate sheets are joined together in consideration of productivity in subsequent processes. From the perspective of preventing scratches on the polymer film surface and improving transportability, the laminate sheets can be treated as a continuous sheet by continuously pasting a long protective film to the polymer film surfaces of the laminates as illustrated in FIG. 1. In that case, the laminates are sometimes stored and transported in a stacked state in which the protective film is folded as illustrated in FIG. 2, but a problem arises that the protective film surface and the inorganic substrate surface stick to each other in that time as well.

Furthermore, from the viewpoint of preventing the glass from being scratched, a protective film may also be pasted to the inorganic substrate surface in both cases of using a polymer solution or a polymer precursor solution and using a pre-filmed polymer. In that case as well, the laminates are sometimes stored and transported in a stacked state in which the protective film is folded sometimes as illustrated in FIG. 3, but a problem arises that the protective film surface and the inorganic substrate surface stick to each other in that time as well.

A problem to be solved by the present invention is to provide an appropriate form and method for storing or transporting a laminate including a polymer film and a rigid temporary support.

In other words, the present invention provides an inorganic substrate/polymer film laminate with attached protective film that can be easily taken out individually in a case of being stored in a stacked state for a long period of time, a stack in which an inorganic substrate/polymer film laminate with attached protective film is stacked, and a storage method of an inorganic substrate/polymer film laminate and a transport method of an inorganic substrate/polymer film laminate using a specific protective film.

Means for Solving the Problems

In other words, the present invention has the following configuration.
[1] A first laminate including an inorganic substrate, a polymer film layer, and a first protective film in this order, in which a surface of the inorganic substrate on an opposite side to the polymer film layer has a surface roughness Ra of 0.02 μm to 1.2 μm.
[2] The first laminate according to [1], in which a dynamic friction coefficient between a surface of the first protective film on an opposite side to the polymer film layer and a surface of the inorganic substrate on an opposite side to the polymer film layer is in a range of 0.02 to 0.25.
[3] A second laminate including a second protective film, an inorganic substrate, a polymer film layer, and a first protective film in this order, in which a surface of the second protective film on an opposite side to the inorganic substrate has a surface roughness Ra of 0.02 μm to 1.2 μm.
[4] The second laminate according to [3], in which a dynamic friction coefficient between a surface of the first protective film on an opposite side to the polymer film layer and a surface of the second protective film on an opposite side to the inorganic substrate is in a range of 0.02 to 0.25.
[5] The second laminate according to [3] or [4], in which a dynamic friction coefficient between surfaces of the second protective films on an opposite side to the inorganic substrate is in a range of 0.02 to 0.25.
[6] The laminate according to any of [1] to [5], in which a diameter of a circumscribed circle of the inorganic substrate is 310 mm or more.
[7] A laminate stack including four or more laminates according to any of [1] to [6] stacked in the same layer direction.
[8] A laminate storage method including storing a laminate in a form of the laminate stack according to [7].
[9] A laminate transport method including transporting a laminate in a form of the laminate stack according to [7].

Effect of the Invention

A laminate of an inorganic substrate and a polymer film processed into a continuous sheet by a protective film is in a vacuum contact state in the case of being packed in a stacked state and stored for a long period of time since the air layer between the first protective film and the facing surface is gradually discharged outside from between the surfaces due to the weight of the laminate when the surface of the inorganic substrate on the opposite outer side to the polymer film is smooth in a case where the second protective film is not used and when the surface of the second protective film is smooth in a case where the second protective film is used. This is the reason why it is difficult to take out the laminates individually when the laminates are stored for a long period of time. This is not a big problem when the size of the laminate is small, but the maximum size of the laminate is an inorganic substrate having a size of about 2 m×3 m when it is assumed that the laminate is handled by display manufacturing equipment. When a plurality of laminates of such size is in a vacuum contact state, it is extremely difficult to separate the laminates, and the glass substrate is likely to be destroyed in a case where the inorganic substrate is glass.

By adopting the configuration of the present invention, such problems can be avoided, and the laminates and protective film-containing laminates of the present invention can be easily taken out individually in a case of being superposed one on another and stored for a long period of time in a stacked state as well.

MODE FOR CARRYING OUT THE INVENTION

Figure 1:
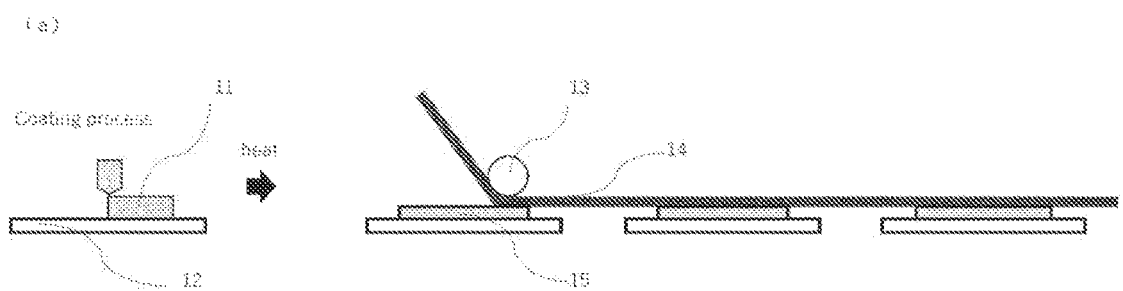
FIG. 1(a) is an example of a first laminate process in which an inorganic substrate 12/polymer film layer 15 laminate is fabricated by applying a polymer solution or polymer precursor solution 11 onto the inorganic substrate 12 and processed into a continuous sheet using a first protective film 14 pasted to the surface of the polymer film layer 15.
FIG. 1(b) is an example of a second laminate process in which an inorganic substrate 12/polymer film layer 15 laminate is fabricated by applying a polymer solution or polymer precursor solution 11 onto the inorganic substrate 12 and processed into a continuous sheet using a first protective film 14 pasted to the surface of the polymer film layer 15 and a second protective film 16.
Figure 1:
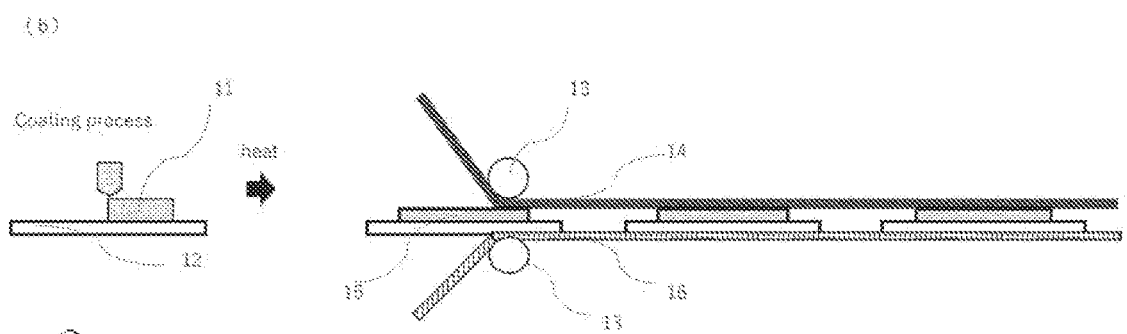
Figure 2:
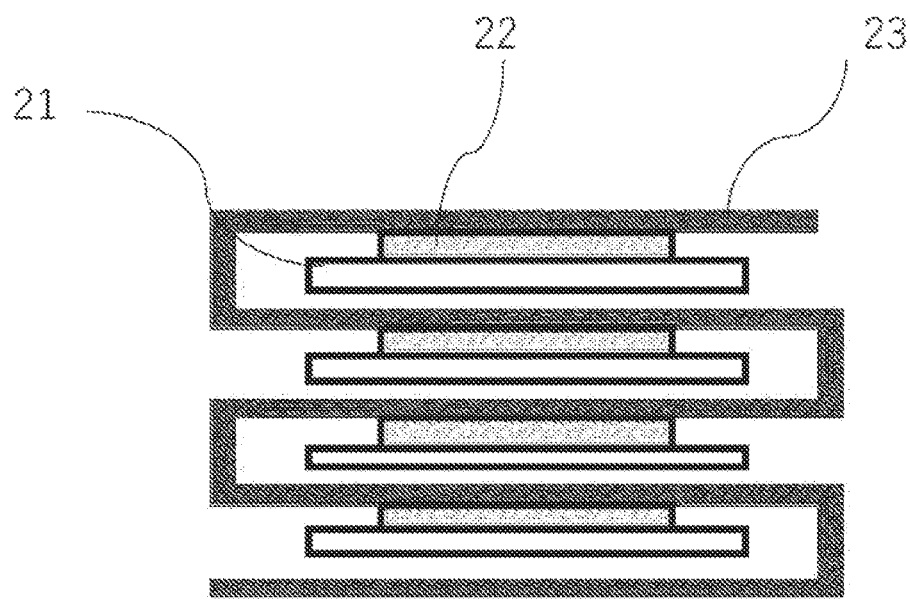
FIG. 2 is a schematic diagram illustrating a cross-sectional structure of a stack in which four first laminates (first protective film 23/polymer film layer 22/inorganic substrate 21) are stacked. The laminates become a continuous sheet, and the continuous sheet is folded in every laminate.
Figure 3:
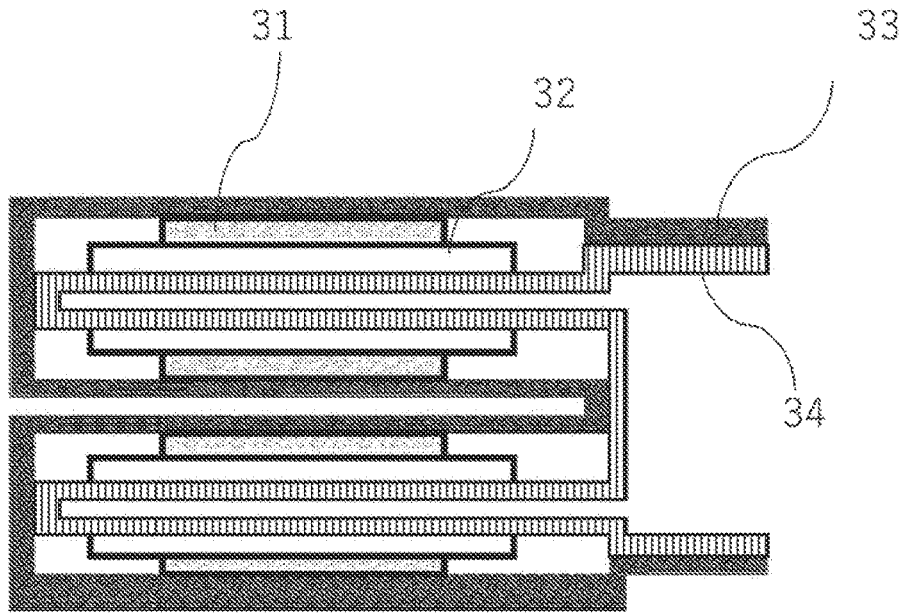
FIG. 3 is a schematic diagram illustrating a cross-sectional structure of a stack in which four second laminates (first protective film 33/polymer film layer 31/inorganic substrate 32/second protective film 34) are stacked. The protective film-containing laminates become a continuous sheet, and the continuous sheet is folded in every laminate.
Figure 4:
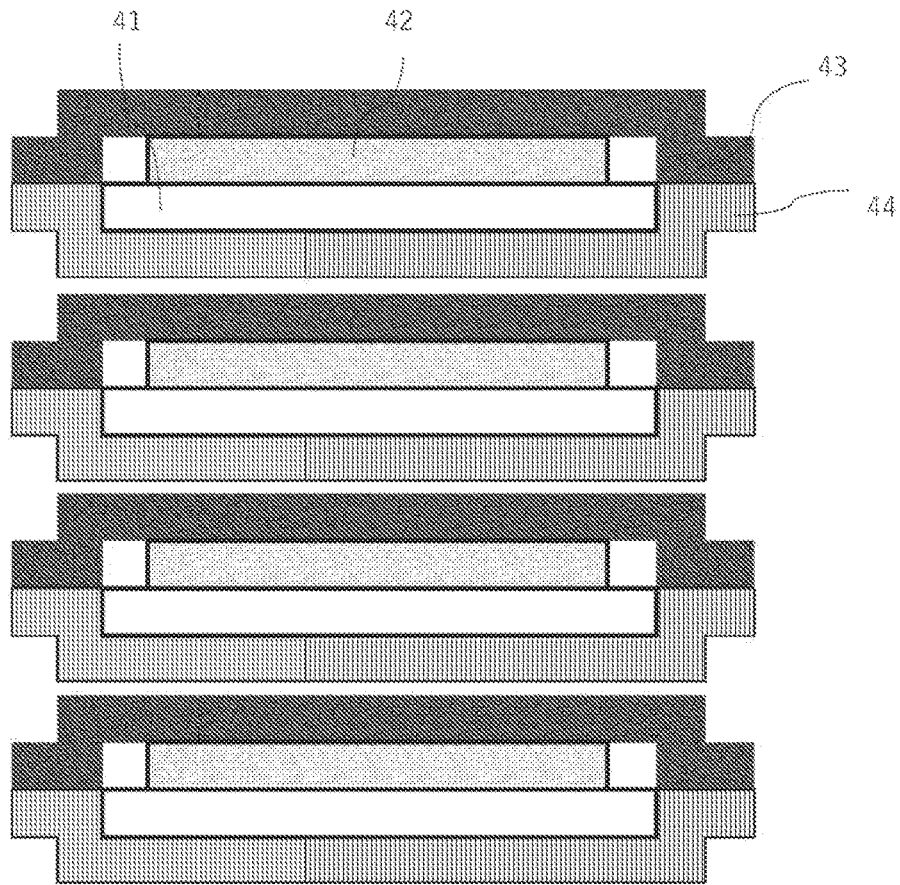
FIG. 4 is a schematic diagram illustrating a cross-sectional structure of a stack in which four second laminates (first protective film 43/polymer film layer 42/inorganic substrate 41/second protective film 44) are stacked.

Hereinafter, an embodiment of the present invention (hereinafter abbreviated as "embodiment") will be described in detail. It should be noted that the present invention is not limited to the following embodiments, and various modifications can be made within the scope of the gist of the present invention.

<Polyamic Acid>

Polyamic acid in the present invention can be produced by a known production method. In other words, one or two or more tetracarboxylic anhydride components and one or two or more diamine components as raw materials are polymerized in an organic solvent to obtain a polyamic acid solution. Preferred solvents for synthesizing polyamic acid are amide-based solvents, namely, N,N-dimethylacetamide, N-methyl-2-pyrrolidone, and the like, and N,N-dimethylacetamide is particularly preferably used. The reactor is preferably equipped with a temperature control instrument for controlling the reaction temperature, and the reaction temperature is preferably 0° C. or more and 80° C. or less, and is still more preferably 15° C. or more and 60° C. or less since hydrolysis of the polyamic acid, which is the reverse reaction of polymerization, is suppressed and the viscosity of polyamic acid is likely to increase.

Diamines constituting polyamic acid are not particularly limited, and aromatic diamines, aliphatic diamines, alicyclic diamines and the like that are commonly used in polyimide synthesis may be used. From the viewpoint of heat resistance, aromatic diamines are preferable. The diamines can be used singly or in combination of two or more kinds thereof.

The diamines are not particularly limited, and examples thereof include oxydianiline (bis(4-aminophenyl) ether and para-phenylenediamine (1,4-phenylenediamine).

As tetracarboxylic acids constituting polyamic acid, aromatic tetracarboxylic acids (including anhydrides thereof), aliphatic tetracarboxylic acids (including anhydrides thereof) and alicyclic tetracarboxylic acids (including anhydrides thereof), which are usually used for polyimide synthesis, can be used. In a case where these are acid anhydrides, the acid anhydrides may have one anhydride structure or two anhydride structures in the molecule, but one (dianhydride) having two anhydride structures in the molecule is preferable. The tetracarboxylic acids may be used singly or in combination of two or more kinds thereof.

The tetracarboxylic acid is not particularly limited, and examples thereof include pyrolimetic dianhydride and 3,3',4,4'-biphenyltetracarboxylic dianhydride.

The polyamic acid heat-cured product is preferably polyimide, and may be colorless and transparent polyimide.

Colorless and transparent polyimide, which is an example of the polyamic acid heat-cured product in the present invention, will be described. In order to avoid complication, colorless and transparent polyimide is simply referred to as transparent polyimide. As the transparency of transparent polyimide, it is preferable that the total light transmittance is 75% or more. The total light transmittance is more preferably 80% or more, still more preferably 85% or more, yet still more preferably 87% or more, particularly preferably 88% or more. The upper limit of the total light transmittance of transparent polyimide is not particularly limited, but is preferably 98% or less, more preferably 97% or less for use as a flexible electronic device. The colorless and transparent polyimide in the present invention is preferably polyimide having a total light transmittance of 75% or more.

The aromatic tetracarboxylic acids for obtaining highly colorless and transparent polyimide in the present invention may be used singly or in combination of two or more kinds thereof. In a case of regarding heat resistance as important, the amount of the aromatic tetracarboxylic acids copolymerized is, for example, preferably 50% by mass or more, more preferably 60% by mass or more, still more preferably 70% by mass or more, yet still more preferably 80% by mass or more, particularly preferably 90% by mass or more of the total amount of all the tetracarboxylic acids, and may be 100% by mass.

Examples of the alicyclic tetracarboxylic acids include tetracarboxylic acids such as 1,2,3,4-cyclobutanetetracarboxylic acid, 1,2,3,4-cyclopentanetetracarboxylic acid, 1,2,3,4-cyclohexanetetracarboxylic acid, 1,2,4,5-cyclohexanetetracarboxylic acid, 3,3',4,4'-bicyclohexyltetracarboxylic acid, bicyclo[2,2,1]heptane-2,3,5,6-tetracarboxylic acid, bicyclo[2,2,2]octane-2,3,5,6-tetracarboxylic acid, bicyclo[2,2,2]octo-7-ene-2,3,5,6-tetracarboxylic acid, tetrahydroanthracene-2,3,6,7-tetracarboxylic acid, tetradecahydro-1,4:5,8:9,10-trimethanoanthracene-2,3,6,7-tetracarboxylic acid, decahydronaphthalene-2,3,6,7-tetracarboxylic acid, decahydro-1,4:5,8-dimethanonaphthalene-2,3,6,7-tetracarboxylic acid, decahydro-1,4-ethano-5,8-methanonaphthalene-2,3,6,7-tetracarboxylic acid, norbornane-2-spiro-α-cyclopentanone-α'-spiro-2"-norbornane-5,5",6,6"-tetracarboxylic acid (also known as "norbornane-2-spiro-2'-cyclopentanone-5'-spiro-2"-norbornane-5,5",6,6"-tetracarboxylic acid"), methylnorbornane-2-spiro-α-cyclopentanone-α'-spiro-2"-(methylnorbornane)-5,5",6,6"-tetracarboxylic acid, norbornane-2-spiro-α-cyclohexanone-α'-spiro-2"-norbornane-5,5",6,6"-tetracarboxylic acid (also known as "norbornane-2-spiro-2'-cyclohexanone-6'-spiro-2"-norbornane-5,5",6,6"-tetracarboxylic acid"), methylnorbornane-2-spiro-α-cyclohexanone-α'-spiro-2"-(methylnorbornane)-5,5",6,6"-tetracarboxylic acid, norbornane-2-spiro-α-cyclopropanone-α'-spiro-2"-norbornane-5,5",6,6"-tetracarboxylic acid, norbornane-2-spiro-α-cyclobutanone-α'-spiro-2"-norbornane-5,5",6,6"-tetracarboxylic acid, norbornane-2-spiro-α-cycloheptanone-α'-spiro-2"-norbornane-5,5",6,6"-tetracarboxylic acid, norbornane-2-spiro-α-cyclooctanone-α'-spiro-2"-norbornane-5,5",6,6"-tetracarboxylic acid, norbornane-2-spiro-α-cyclononanone-α'-spiro-2"-norbornane-5,5",6,6"-tetracarboxylic acid, norbornane-2-spiro-α-cyclodecanone-α'spiro-2"-norbornane-5,5",6,6"-tetracarboxylic acid, norbornane-2-spiro-α-cycloundecanone-α'-spiro-2"-norbornane-5,5",6,6"-tetracarboxylic acid, norbornane-2-spiro-α-cyclododecanone-α'-spiro-2"-norbornane-5,5",6,6"-tetracarboxylic acid, norbornane-2-spiro-α-cyclotridecanone-α'-spiro-2''-norbornane-5,5'',6,6''-tetracarboxylic acid, norbornane-2-spiro-α-cyclotetradecanone-α'-spiro-2''-norbornane-5,5'',6,6''-tetracarboxylic acid, norbornane-2-spiro-α-cyclopentadecanone-α'-spiro-2''-norbornane-5,5'',6,6''-tetracarboxylic acid, norbornane-2-spiro-α-(methylcyclopentanone)-α'-spiro-2''-norbornane-5,5'',6,6''-tetracarboxylic acid, and norbornane-2-spiro-α-(methylcyclohexanone)-α'-spiro-2''-norbornane-5,5'',6,6''-tetracarboxylic acid, and acid anhydrides thereof. Among these, dianhydrides having two acid anhydride structures are suitable, particularly 1,2,3,4-cyclobutanetetracarboxylic dianhydride, 1,2,3,4-cyclohexanetetracarboxylic dianhydride, and 1,2,4,5-cyclohexanetetracarboxylic dianhydride are preferable, 1,2,3,4-cyclobutanetetracarboxylic dianhydride and 1,2,4,5-cyclohexanetetracarboxylic dianhydride are more preferable, and 1,2,3,4-cyclobutanetetracarboxylic dianhydride is still more preferable. These may be used singly or in combination of two or more kinds thereof. In a case of regarding transparency as important, the amount of the aromatic tetracarboxylic acids copolymerized is, for example, preferably 50% by mass or more, more preferably 60% by mass or more, still more preferably 70% by mass or more, yet still more preferably 80% by mass or more, particularly preferably 90% by mass or more of the total amount of all the tetracarboxylic acids, and may be 100% by mass.

Examples of the tricarboxylic acids include aromatic tricarboxylic acids such as trimellitic acid, 1,2,5-naphthalenetricarboxylic acid, diphenyl ether-3,3',4'-tricarboxylic acid, and diphenylsulfone-3,3',4'-tricarboxylic acid, or hydrogenated products of the aromatic tricarboxylic acids such as hexahydrotrimellitic acid, and alkylene glycol bistrimellitates such as ethylene glycol bistrimellitate, propylene glycol bistrimellitate, 1,4-butanediol bistrimellitate, and polyethylene glycol bistrimellitate and monoanhydrides and esterified products thereof. Among these, monoanhydrides having one acid anhydride structure are suitable, and particularly trimellitic anhydride and hexahydrotrimellitic anhydride are preferable. These may be used singly or a plurality of these may be used in combination.

Examples of the dicarboxylic acids include aromatic dicarboxylic acids such as terephthalic acid, isophthalic acid, orthophthalic acid, naphthalenedicarboxylic acid, and 4,4'-oxydibenzenecarboxylic acid, or hydrogenated products of the aromatic dicarboxylic acids such as 1,6-cyclohexanedicarboxylic acid, and oxalic acid, succinic acid, glutaric acid, adipic acid, heptanedioic acid, octanedioic acid, azelaic acid, sebacic acid, undecanedioic acid, dodecanedioic acid, and 2-methylsuccinic acid and acid chlorides or esterified products thereof. Among these, aromatic dicarboxylic acids and hydrogenated products thereof are suitable, and particularly terephthalic acid, 1,6-cyclohexanedicarboxylic acid, and 4,4'-oxydibenzenecarboxylic acid are preferable. The dicarboxylic acids may be used singly or a plurality of these may be used in combination.

The diamines or isocyanates for obtaining the highly colorless and transparent polyimide in the present invention are not particularly limited, and it is possible to use aromatic diamines, aliphatic diamines, alicyclic diamines, aromatic diisocyanates, aliphatic diisocyanates, alicyclic diisocyanates and the like that are usually used in the polyimide synthesis, polyamide-imide synthesis, and polyamide synthesis. Aromatic diamines are preferable from the viewpoint of heat resistance, and alicyclic diamines are preferable from the viewpoint of transparency. When aromatic diamines having a benzoxazole structure are used, a high elastic modulus, low heat shrinkability, and a low coefficient of linear thermal expansion as well as high heat resistance can be exerted. The diamines and isocyanates may be used singly or in combination of two or more kinds thereof.

Examples of the aromatic diamines include: 2,2'-dimethyl-4,4'-diaminobiphenyl; 1,4-bis[2-(4-aminophenyl)-2-propyl]benzene; 1,4-bis(4-amino-2-trifluoromethylphenoxy)benzene; 2,2'-ditrifluoromethyl-4,4'-diaminobiphenyl; 4,4'-bis(4-aminophenoxy)biphenyl; 4,4'-bis(3-aminophenoxy)biphenyl; bis[4-(3-aminophenoxy)phenyl]ketone; bis[4-(3-aminophenoxy)phenyl]sulfide; bis[4-(3-aminophenoxy)phenyl]sulfone; 2,2-bis[4-(3-aminophenoxy)phenyl]propane; 2,2-bis[4-(3-aminophenoxy)phenyl]-1,1,1,3,3,3-hexafluoropropane; m-phenylenediamine; o-phenylenediamine; p-phenylenediamine; m-aminobenzylamine; p-aminobenzylamine; 4-amino-N-(4-aminophenyl)benzamide; 3,3'-diaminodiphenylether; 3,4'-diaminodiphenylether; 4,4'-diaminodiphenylether; 2,2'-trifluoromethyl-4,4'-diaminodiphenylether; 3,3'-diaminodiphenylsulfide; 3,4'-diaminodiphenylsulfide; 4,4'-diaminodiphenylsulfide; 3,3'-diaminodiphenylsulfoxide; 3,4'-diaminodiphenylsulfoxide; 4,4'-diaminodiphenylsulfoxide; 3,3'-diaminodiphenyl sulfone; 3,4'-diaminodiphenyl sulfone; 4,4'-diaminodiphenyl sulfone; 3,3'-diaminobenzophenone; 3,4'-diaminobenzophenone; 4,4'-diaminobenzophenone; 3,3'-diaminodiphenylmethane; 3,4'-diaminodiphenylmethane; 4,4'-diaminodiphenylmethane; bis[4-(4-aminophenoxy)phenyl]methane; 1,1-bis[4-(4-aminophenoxy)phenyl]ethane; 1,2-bis[4-(4-aminophenoxy)phenyl]ethane; 1,1-bis[4-(4-aminophenoxy)phenyl]propane; 1,2-bis[4-(4-aminophenoxy)phenyl]propane; 1,3-bis[4-(4-aminophenoxy)phenyl]propane; 2,2-bis[4-(4-aminophenoxy)phenyl]propane; 1,1-bis[4-(4-aminophenoxy)phenyl]butane; 1,3-bis[4-(4-aminophenoxy)phenyl]butane; 1,4-bis[4-(4-aminophenoxy)phenyl]butane; 2,2-bis[4-(4-aminophenoxy)phenyl]butane; 2,3-bis[4-(4-aminophenoxy)phenyl]butane; 2-[4-(4-aminophenoxy)phenyl]-2-[4-(4-aminophenoxy)-3-methylphenyl]propane; 2,2-bis[4-(4-aminophenoxy)-3-methylphenyl]propane; 2-[4-(4-aminophenoxy)phenyl]-2-[4-(4-aminophenoxy)-3,5-dimethylphenyl]propane; 2,2-bis[4-(4-aminophenoxy)-3,5-dimethylphenyl]propane; 2,2-bis[4-(4-aminophenoxy)phenyl]-1,1,1,3,3,3-hexafluoropropane; 1,4-bis(3-aminophenoxy)benzene; 1,3-bis(3-aminophenoxy)benzene; 1,4-bis(4-aminophenoxy)benzene; 4,4'-bis(4-aminophenoxy)biphenyl; bis[4-(4-aminophenoxy)phenyl]ketone; bis[4-(4-aminophenoxy)phenyl]sulfide; bis[4-(4-aminophenoxy)phenyl]sulfoxide; bis[4-(4-aminophenoxy)phenyl]sulfone; bis[4-(3-aminophenoxy)phenyl]ether; bis[4-(4-aminophenoxy)phenyl]ether; 1,3-bis[4-(4-aminophenoxy)benzoyl]benzene; 1,3-bis[4-(3-aminophenoxy)benzoyl]benzene; 1,4-bis[4-(3-aminophenoxy)benzoyl]benzene; 4,4'-bis[(3-aminophenoxy)benzoyl]benzene; 1,1-bis[4-(3-aminophenoxy)phenyl]propane; 1,3-bis[4-(3-aminophenoxy)phenyl]propane; 3,4'-diaminodiphenylsulfide; 2,2-bis[3-(3-aminophenoxy)phenyl]-1,1,1,3,3,3-hexafluoropropane; bis[4-(3-aminophenoxy)phenyl]methane; 1,1-bis[4-(3-aminophenoxy)phenyl]ethane; 1,2-bis[4-(3-aminophenoxy)phenyl]ethane; bis[4-(3-aminophenoxy)phenyl]sulfoxide; 4,4'-bis[3-(4-aminophenoxy)benzoyl]diphenylether; 4,4'-bis[3-(3-aminophenoxy)benzoyl]diphenylether; 4,4'-bis[4-(4-amino-α,α-dimethylbenzyl)phenoxy]benzophenone; 4,4'-bis[4-(4-amino-α,α-dimethylbenzyl)phenoxy]diphenyl sulfone; bis[4-{4-(4-aminophenoxy)phenoxy}phenyl] sulfone; 1,4-bis[4-(4-aminophenoxy)phenoxy-α,α-dimethylbenzyl]benzene; 1,3-bis[4-(4-aminophenoxy)phenoxy-α,α-dimethylbenzyl]benzene; 1,3-bis[4-(4-amino-6-trifluoromethylphenoxy)-α,α-dimethylbenzyl]benzene; 1,3-bis[4-(4-amino-6-fluorophenoxy)-α,α-dimethylbenzyl]benzene; 1,3-bis[4-(4-amino-6-methylphenoxy)-α,α-dimethylbenzyl]benzene; 1,3-bis[4-(4-amino-6-cyanophenoxy)-α,α-dimethylbenzyl]benzene; 3,3'-diamino-4,4'-diphenoxybenzophenone; 4,4'-diamino-5,5'-diphenoxybenzophenone; 3,4'-diamino-4,5'-diphenoxybenzophenone; 3,3'-diamino-4-phenoxybenzophenone; 4,4'-diamino-5-phenoxybenzophenone, 3,4'-diamino-4-phenoxybenzophenone; 3,4'-diamino-5'-phenoxybenzophenone; 3,3'-diamino-4,4'-dibiphenoxybenzophenone; 4,4'-diamino-5,5'-dibiphenoxybenzophenone; 3,4'-diamino-4,5'-dibiphenoxybenzophenone; 3,3'-diamino-4-biphenoxybenzophenone; 4,4'-diamino-5-biphenoxybenzophenone; 3,4'-diamino-4-biphenoxybenzophenone; 3,4'-diamino-5'-biphenoxybenzophenone; 1,3-bis(3-amino-4-phenoxybenzoyl)benzene; 1,4-bis(3-amino-4-phenoxybenzoyl)benzene; 1,3-bis(4-amino-5-phenoxybenzoyl)benzene; 1,4-bis(4-amino-5-phenoxybenzoyl)benzene; 1,3-bis(3-amino-4-biphenoxybenzoyl)benzene, 1,4-bis(3-amino-4-biphenoxybenzoyl)benzene; 1,3-bis(4-amino-5-biphenoxybenzoyl)benzene; 1,4-bis(4-amino-5-biphenoxybenzoyl)benzene; 2,6-bis[4-(4-amino-α,α-dimethylbenzyl)phenoxy]benzonitrile; 4,4'-[9H-fluorene-9,9-diyl]bisaniline (also known as "9,9-bis(4-aminophenyl)fluorene"); spiro(xanthene-9,9'-fluorene)-2,6-diyl bis(oxycarbonyl)]bisaniline; 4,4'-[spiro(xanthene-9,9'-fluorene)-2,6-diyl bis(oxycarbonyl)]bisaniline; and 4,4'-[spiro(xanthene-9,9'-fluorene)-3,6-diyl bis(oxycarbonyl)]bisaniline. A part or all of hydrogen atoms on an aromatic ring of the above-described aromatic diamines may be substituted with halogen atoms; alkyl groups or alkoxyl groups having 1 to 3 carbon atoms; or cyano groups, and further a part or all of hydrogen atoms of the alkyl groups or alkoxyl groups having 1 to 3 carbon atoms may be substituted with halogen atoms. The aromatic diamines having a benzoxazole structure are not particularly limited, and examples thereof include: 5-amino-2-(p-aminophenyl)benzoxazole; 6-amino-2-(p-aminophenyl)benzoxazole; 5-amino-2-(m-aminophenyl)benzoxazole; 6-amino-2-(m-aminophenyl)benzoxazole; 2,2'-p-phenylenebis(5-aminobenzoxazole); 2,2'-p-phenylenebis(6-aminobenzoxazole); 1-(5-aminobenzoxazolo)-4-(6-aminobenzoxazolo)benzene; 2,6-(4,4'-diaminodiphenyl)benzo[1,2-d:5,4-d']bisoxazole; 2,6-(4,4'-diaminodiphenyl)benzo[1,2-d:4,5-d']bisoxazole; 2,6-(3,4'-diaminodiphenyl)benzo[1,2-d:5,4-d']bisoxazole; 2,6-(3,4'-diaminodiphenyl)benzo[1,2-d:4,5-d']bisoxazole; 2,6-(3,3'-diaminodiphenyl)benzo[1,2-d:5,4-d']bisoxazole; and 2,6-(3,3'-diaminodiphenyl)benzo[1,2-d:4,5-d']bisoxazole. Among these, particularly 2,2'-ditrifluoromethyl-4,4'-diaminobiphenyl, 4-amino-N-(4-aminophenyl)benzamide, 4,4'-diaminodiphenyl sulfone, and 3,3'-diaminobenzophenone are preferable. The aromatic diamines may be used singly or a plurality of these may be used in combination.

Examples of the alicyclic diamines include 1,4-diaminocyclohexane, 1,4-diamino-2-methylcyclohexane, 1,4-diamino-2-ethylcyclohexane, 1,4-diamino-2-n-propylcyclohexane, 1,4-diamino-2-isopropylcyclohexane, 1,4-diamino-2-n-butylcyclohexane, 1,4-diamino-2-isobutylcyclohexane, 1,4-diamino-2-sec-butylcyclohexane, 1,4-diamino-2-tert-butylcyclohexane, and 4,4'-methylenebis(2,6-dimethylcyclohexylamine). Among these, particularly 1,4-diaminocyclohexane and 1,4-diamino-2-methylcyclohexane are preferable, and 1,4-diaminocyclohexane is more preferable.

The alicyclic diamines may be used singly or a plurality of these may be used in combination.

Examples of the diisocyanates include aromatic diisocyanates such as diphenylmethane-2,4'-diisocyanate, 3,2'- or 3,3'- or 4,2'- or 4,3'- or 5,2'- or 5,3'- or 6,2'- or 6,3'-dimethyldiphenylmethane-2,4'-diisocyanate, 3,2'- or 3,3'- or 4,2'- or 4,3'- or 5,2'- or 5,3'- or 6,2'- or 6,3'-diethyldiphenylmethane-2,4'-diisocyanate, 3,2'- or 3,3'- or 4,2'- or 4,3'- or 5,2'- or 5,3'- or 6,2'- or 6,3'-dimethoxydiphenylmethane-2,4'-diisocyanate, diphenylmethane-4,4'-diisocyanate, diphenylmethane-3,3'-diisocyanate, diphenylmethane-3,4'-diisocyanate, diphenyl ether-4,4'-diisocyanate, benzophenone-4,4'-diisocyanate, diphenylsulfone-4,4'-diisocyanate, tolylene-2,4-diisocyanate, tolylene-2,6-diisocyanate, m-xylylene diisocyanate, p-xylylene diisocyanate, naphthalene-2,6-diisocyanate, 4,4'-(2,2 bis(4-phenoxyphenyl)propane)diisocyanate, 3,3'- or 2,2'-dimethylbiphenyl-4,4'-diisocyanate, 3,3'- or 2,2'-diethylbiphenyl-4,4'-diisocyanate, 3,3'-dimethoxybiphenyl-4,4'-diisocyanate, and 3,3'-diethoxybiphenyl-4,4'-diisocyanate, and hydrogenated diisocyanates of any of these (for example, isophorone diisocyanate, 1,4-cyclohexane diisocyanate, 1,3-cyclohexane diisocyanate, 4,4'-dicyclohexylmethane diisocyanate, and hexamethylene diisocyanate). Among these, diphenylmethane-4,4'-diisocyanate, tolylene-2,4-diisocyanate, tolylene-2,6-diisocyanate, 3,3'-dimethylbiphenyl-4,4'-diisocyanate, naphthalene-2,6-diisocyanate, 4,4'-dicyclohexylmethane diisocyanate, and 1,4-cyclohexane diisocyanate are preferable from the viewpoint of low moisture absorption property, dimensional stability, price, and polymerizability. The diisocyanates may be used singly or a plurality of these may be used in combination.

<Polymer Film Layer>

The polymer film layer of the present invention is a layer including a polymer film, and is obtained by heating a polymer solution to volatilize the solvent, or by heating a polymer precursor solution to volatilize the solvent and perform curing. Examples of the polymer solution include soluble polyimide, and examples of the polymer precursor solution include a polyamic acid solution. The polymer film layer may have a single-layer configuration or a multi-layer (laminated) configuration of two or more layers. In a case where the polymer film layer has a multi-layer configuration, the respective polymer film layers may have the same composition or different compositions. In a case where the polymer film layer has a single-layer structure, the physical properties (melting point, glass transition temperature, yellowness index, total light transmittance, haze, CTE and the like) of the polymer film layer refer to the values of the entire polymer film layer. In a case where the polymer film layer has a multi-layer structure as well, the physical properties of the polymer film layer refer to the values of the entire polymer film layer.

The average coefficient of linear thermal expansion (CTE) of the polymer film layer at between 30° C. and 250° C. is preferably 50 ppm/K or less. The CTE is more preferably 45 ppm/K or less, still more preferably 40 ppm/K or less, yet still more preferably 30 ppm/K or less, particularly preferably 20 ppm/K or less. The CTE is preferably −5 ppm/K or more, more preferably −3 ppm/K or more, still more preferably 1 ppm/K or more. When the CTE is in the above range, a small difference in coefficient of linear thermal expansion between the polymer film layer and a general support (inorganic substrate) can be maintained, and the polymer film layer can be prevented from peeling off from the inorganic substrate or warping together with the support when being subjected to a process in which heat is applied as well. Here, CTE is a factor that indicates reversible expansion and contraction with respect to temperature. The CTE of the polymer film layer refers to the average value of the CTE in the machine direction (MD direction) of the polymer solution or polymer precursor solution and the CTE in the transverse direction (TD direction). The method for measuring CTE of the polymer film layer is as described in Examples.

The polymer film layer is preferably a polyimide film, and may be a transparent polyimide film. In a case where the polymer film layer is a transparent polyimide film (hereinafter, also referred to as a transparent polymer film layer), the yellowness index (hereafter, also referred to as "yellow index" or "YI") of the transparent polyimide film is preferably 10 or less, more preferably 7 or less, still more preferably 5 or less, yet still more preferably 3 or less. The lower limit of the yellowness index of the transparent polyimide is not particularly limited, but is preferably 0.1 or more, more preferably 0.2 or more, still more preferably 0.3 or more for use as a flexible electronic device.

The light transmittance of the transparent polymer film layer at a wavelength of 400 nm in the present invention is preferably 70% or more, more preferably 72% or more, still more preferably 75% or more, yet still more preferably 80% or more. The upper limit of the light transmittance of the transparent polymer film layer at a wavelength of 400 nm is not particularly limited, but is preferably 99% or less, more preferably 98% or less, still more preferably 97% or less for use as a flexible electronic device.

The haze of the transparent polymer film layer in the present invention is preferably 1.0 or less, more preferably 0.8 or less, still more preferably 0.5 or less, yet still more preferably 0.3 or less. The lower limit of haze is not particularly limited, but industrially, there is no problem when the haze is 0.01 or more and the haze may be 0.05 or more.

The melting point of the polymer film layer is preferably 250° C. or more, more preferably 300° C. or more, still more preferably 400° C. or more. The glass transition temperature of the polymer film layer is preferably 200° C. or more, more preferably 320° C. or more, still more preferably 380° C. or more. In the present specification, the melting point and the glass transition temperature are determined by differential thermal analysis (DSC). In a case where the melting point exceeds 500° C., it may be determined whether or not the temperature has reached the melting point by visually observing the thermal deformation behavior when the highly heat-resistant transparent film is heated at this temperature.

The thickness of the polymer film layer in the present invention is preferably 5 μm or more, more preferably 8 μm or more, still more preferably 15 μm or more, yet still more preferably 20 μm or more. The upper limit of the thickness of the polymer film layer is not particularly limited but is preferably 200 μm or less, more preferably 150 μm or less, still more preferably 90 μm or less for use as a flexible electronic device. Handling after device formation may become difficult when the thickness is too thin, and the flexibility may be impaired when the thickness is too thick.

Unevenness of the thickness of the polymer film layer is preferably 20% or less, more preferably 12% or less, still more preferably 7% or less, particularly preferably 4% or less. When the unevenness of the thickness exceeds 20%, the polymer film layer tends to be hardly adopted to a narrow portion. Unevenness of the thickness of the polymer film layer can be determined, for example, based on the following equation after peeling off the polymer film layer from the inorganic substrate, randomly selecting about 10 points positioned in the polymer film layer and measuring the thickness of the polymer film layer using a contact-type film thickness meter.

Unevenness of thickness of polyamic acid heat-cured product (%)

=100×(maximum thickness−minimum thickness)/ average thickness

The polymer film layer may contain a reaction catalyst (imidization catalyst), inorganic fine particles and the like, if necessary. The reaction catalyst, inorganic fine particles and the like are preferably added to the polymer solution or the polymer precursor solution in advance, if necessary.

A tertiary amine is preferably used as the imidization catalyst. A heterocyclic tertiary amine is still more preferable as the tertiary amine. Preferred specific examples of heterocyclic tertiary amines include pyridine, 2,5-diethylpyridine, picoline, quinoline and isoquinoline. The amount of the imidizing agent used is preferably 0.01 to 2.00 equivalents, particularly 0.02 to 1.20 equivalents with respect to the reaction site of polyamic acid (polyimide precursor). It is not preferable that the amount of the imidization catalyst is less than 0.01 equivalent since the effect of the catalyst may not be sufficiently obtained. It is not preferable that the amount of the imidization catalyst is more than 2.00 equivalents from the viewpoint of cost since the proportion of the catalyst that does not participate in the reaction increases.

Examples of inorganic fine particles include inorganic oxide powders such as particulate silicon dioxide (silica) and aluminum oxide powders and inorganic salt powders such as particulate calcium carbonate and calcium phosphate powders. In the field of the present invention, coarse particles of these inorganic fine particles may cause defects in subsequent processes, so it is preferable that these inorganic fine particles are dispersed uniformly.

<Inorganic Substrate>

The inorganic substrate may be a plate-type substrate which can be used as a substrate made of an inorganic substance, and examples thereof include those mainly composed of glass plates, ceramic plates, semiconductor wafers, metals and the like and those in which these glass plates, ceramic plates, semiconductor wafers, and metals are laminated, those in which these are dispersed, and those in which fibers of these are contained as the composite of these.

Examples of the glass plates include quartz glass, high silicate glass (96% silica), soda lime glass, lead glass, aluminoborosilicate glass, and borosilicate glass (Pyrex (registered trademark)), borosilicate glass (alkali-free), borosilicate glass (microsheet), aluminosilicate glass and the like. Among these, those having a coefficient of linear thermal expansion of 5 ppm/K or less are desirable, and in the case of a commercially available product, "Corning (registered trademark) 7059", "Corning (registered trademark) 1737", and "EAGLE" manufactured by Corning Inc., "AN100" manufactured by AGC Inc., "OA10" and "OA11G" manufactured by Nippon Electric Glass Co., Ltd., "AF32" manufactured by SCHOTT AG, and the like that are glass for liquid crystal are desirable.

The semiconductor wafer is not particularly limited, but examples thereof include a silicon wafer and wafers of germanium, silicon-germanium, gallium-arsenide, aluminum-gallium-indium, nitrogen-phosphorus-arsenic-antimony, SiC, InP (indium phosphide), InGaAs, GaInNAs, LT, LN, ZnO (zinc oxide), CdTe (cadmium telluride), ZnSe (zinc selenide) and the like. Among these, the wafer preferably used is a silicon wafer, and a mirror-polished silicon wafer having a size of 8 inches or more is particularly preferable.

The metals include single element metals such as W, Mo, Pt, Fe, Ni, and Au, alloys such as Inconel, Monel, Nimonic, carbon-copper, Fe—Ni-based Invar alloy, and Super Invar alloy, and the like. Multilayer metal plates formed by adding another metal layer or a ceramic layer to these metals are also included. In this case, when the overall coefficient of linear thermal expansion (CTE) with the additional layer is low, Cu, Al and the like are also used in the main metal layer. The metals used as the additional metal layer is not limited as long as they are those that strengthen the close contact property with the polyamic acid heat-cured product and those that have properties that diffusion does not occur and the chemical resistance and heat resistance are favorable, but suitable examples thereof include Cr, Ni, TiN, and Mo-containing Cu.

Examples of the ceramic plate in the present invention include ceramics for base such as $Al_2O_3$, mullite, ALN, SiC, crystallized glass, cordierite, spodumene, Pb-BSG+Ca-$ZrO_3$+$Al_2O_3$, crystallized glass+$Al_2O_3$, crystallized Ca-BSG, BSG+quartz, BSG+$Al_2O_3$, Pb-BSG+$Al_2O_3$, glass-ceramic, and zerodur material.

The thickness of the inorganic substrate is not particularly limited, but a thickness of 10 mm or less is preferable, a thickness of 3 mm or less is more preferable, and a thickness of 1.3 mm or less is still more preferable from the viewpoint of handleability. The lower limit of the thickness is not particularly limited, but is preferably 0.07 mm or more, more preferably 0.15 mm or more, still more preferably 0.3 mm or more. When the inorganic substrate is too thin, the inorganic substrate is easily destroyed and it is difficult to handle the inorganic substrate. When the inorganic substrate is too thick, the inorganic substrate is heavy and it is difficult to handle the inorganic substrate.

Surface treatment may be performed for the purpose of improving the wettability and adhesive property of the inorganic substrate. As the surface treatment agent to be used, coupling agents such as a silane coupling agent, an aluminum-based coupling agent, and a titanate meter coupling agent can be used. In particular, excellent properties can be obtained when a silane coupling agent is used.

<Silane Coupling Agent (SCA)>

The laminate preferably has a silane coupling agent layer (also referred to as a silane coupling agent condensed layer) between the polymer film layer and the inorganic substrate. In the present invention, the silane coupling agent refers to a compound containing a Si (silicon) component at 10% by mass or more. By using the silane coupling agent layer, the intermediate layer between the polyamic acid heat-cured product layer and the inorganic substrate can be thinned, and thus there are effects that the amounts of degassed components during heating are small, elution hardly occurs in the wet process as well, and only trace amounts of components are eluted even if elution occurs. The silane coupling agent preferably contains a large amount of silicon oxide component since the heat resistance is improved, and is particularly preferably one exhibiting heat resistance at a temperature of about 400° C. The thickness of the silane coupling agent layer is preferably 200 nm or less (0.2 μm or less). As a range for use as a flexible electronic device, the thickness of the silane coupling agent layer is preferably 100 nm or less (0.1 μm or less), more desirably 50 nm or less, still more desirably 10 nm. When a silane coupling agent layer is normally fabricated, the thickness thereof is about 0.10 μm or less. In processes where it is desired to use as little silane coupling agent as possible, a silane coupling agent layer having a thickness of 5 nm or less can also be used. Since the peel strength may decrease or there may be some parts that are not attached when the thickness is less than 0.1 nm, and the thickness is preferably 0.1 nm or more, more preferably 0.5 nm or more.

The silane coupling agent in the present invention is not particularly limited, but one having an amino group or an epoxy group is preferable. When heat resistance is required in the process, a silane coupling agent, in which Si and an amino group or the like is linked to each other via an aromatic, is desirable.

The silane coupling agent is not particularly limited, but preferably contains a coupling agent having an amino group. Specific examples thereof include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloride, aminophenyltrimethoxysilane, aminophenethyltrimethoxysilane, and aminophenylaminomethylphenethyltrimethoxysilane.

<Protective Film>

The first protective film and/or the second protective film are not particularly limited, and it is possible to use heat-resistant super engineering plastic films such as a PPS film, a PEEK film, an aromatic polyamide film, a polyimide film, and a polyimide benzasol film in addition to a PET film, a PEN film, a polyethylene film, a polypropylene film, a nylon film, and the like. Among these, a PET film is preferable. The first protective film and the second protective film may be the same film or different films. Industrially, both the first protective film and the second protective film are preferably the same film, more preferably a PET film.

The protective film preferably has a pressure sensitive adhesive layer on the surface in contact with the polymer film layer and/or the inorganic substrate. By having a pressure sensitive adhesive layer on the protective film, self-adsorptive properties can be exerted. The pressure sensitive adhesive layer is not particularly limited, but for example, urethane-based, silicone-based, and acrylic-based pressure sensitive adhesive layers can be used. The pressure sensitive adhesive layer can be fabricated by applying a pressure sensitive adhesive dissolved in a solvent and drying the pressure sensitive adhesive.

<Laminate>

The first laminate of the present invention is a laminate, which includes an inorganic substrate, a polymer film layer, and a first protective film in this order, and in which the surface of the inorganic substrate on the opposite side to the polymer film layer has a surface roughness Ra of 0.02 μm to 1.2 μm. In other words, the laminated configuration has at least three layers of "inorganic substrate/polymer film layer/first protective film". The second laminate is a laminate, which includes a second protective film, an inorganic substrate, a polymer film layer, and a first protective film in this order, and in which the surface of the second protective film on the opposite side to the inorganic substrate has a surface roughness Ra of 0.02 μm to 1.2 μm. In other words, the laminated configuration has at least four layers of "second protective film/inorganic substrate/polymer film layer/first protective film". The silane coupling agent and other layers may be interposed between the respective layers. Another layer may be laminated on the side of the first protective film opposite to the polymer film layer, and another layer may be laminated on the side of the second protective film opposite to the inorganic substrate. In the present invention, the first laminate and the second laminate are also collectively simply referred to as laminates. The first protective film and the second protective film are also collectively simply referred to as protective films.

<Method for Manufacturing Laminate>

A laminate of an inorganic substrate and a polymer film layer can be manufactured by casting the aforementioned polymer solution or polymer precursor solution on an inorganic substrate and performing heating.

A known method can be used as a method for casting the polymer solution or polymer precursor solution. Examples thereof include known casting methods such as a gravure coating method, a spin coating method, a silk screen method, a dip coating method, a bar coating method, a knife coating method, a roll coating method, and a die coating method.

In a case where the polymer precursor solution is a polyamic acid solution, the above-mentioned polymerization solution may be used as it is as the polyamic acid solution, but the solvent may be removed or added, if necessary. Examples of the solvent that can be used in the polyamic acid solution include dimethyl sulfoxide, hexamethyl phosphoride, acetonitrile, acetone, and tetrahydrofuran in addition to N,N-dimethylformamide, N,N-dimethylacetamide, and N-methyl-2-pyrrolidone. As cosolvents, xylene, toluene, benzene, diethylene glycol ethyl ether, diethylene glycol dimethyl ether, 1,2-bis-(2-methoxyethoxy)ethane bis (2-methoxyethyl)ether, butyl cellosolve, butyl cellosolve acetate, propylene glycol methyl ether and propylene glycol methyl ether acetate may be used in combination.

The polyamic acid of the present invention is preferably thermally imidized (heat-cured) at 300° C. or more and 450° C. or less. In other words, the polyimide of the present invention is preferably obtained by thermally imidizing (heat-curing) the polyamic acid at 300° C. to 450° C.

Thermal imidization is a method in which the imidization reaction proceeds only by heating without the action of a dehydration ring-closing agent and the like. The heating temperature and heating time at this time can be determined as appropriate, and may be set, for example, as follows. First, in order to volatilize the solvent, heating is performed at a temperature of 90° C. to 200° C. for 3 to 120 minutes. With regard to the heating atmosphere, heating can be performed under air, under reduced pressure, or in an inert gas such as nitrogen. As the heating apparatus, known apparatuses such as a hot air oven, an infrared oven, a vacuum oven, and a hot plate can be used. Next, in order to further promote imidization, heating is performed at a temperature of 200° C. to 450° C. for 3 to 240 minutes. As the heating conditions at this time, it is preferable that the temperature is gradually increased from a low temperature to a high temperature. The highest temperature is preferably in a range of 300° C. to 450° C. It is not preferable that the highest temperature is lower than 300° C. since the thermal imidization is unlikely to proceed and the mechanical properties of the obtained polyimide film deteriorate. It is not preferable that the highest temperature is higher than 450° C. since the thermal degradation of polyimide proceeds and the properties deteriorate. There is also a case where the film spontaneously peels off from the inorganic substrate during the heat treatment depending on the kind and thickness of polyamic acid, the kind and surface state of the inorganic substrate, and the heating conditions and heating method at the time of heating. It is not preferable that spontaneous peeling occurs since it is difficult to obtain a laminate exhibiting excellent properties. In general, spontaneous peeling is more likely to occur as the film is thicker, so it is preferable to adjust the above-mentioned conditions for each thickness. In order to suppress spontaneous peeling, casting of the polyamic acid solution and thermal imidization may be performed dividedly multiple times.

The content of the solvent contained in polyimide is preferably 1% by mass or less, more preferably 0.5% by mass or less, still more preferably 0.1% by mass or less. Since it is more preferable as the content of the solvent is lower, the lower limit is not particularly limited, but is industrially only required to be 0.01% by mass or more and may be 0.05% by mass or more.

For the application of the polyamic acid solution on the inorganic substrate in the present invention, a plurality of different polyamic acid solutions may be applied sequentially or simultaneously in multiple layers. A plurality of different polyamic acid solutions here refer to specifically polyamic acid solutions having different compositions, polyamic acid solutions having different imidization ratios, and polyamic acid solutions in which the kinds and amounts of added inorganic particles and additives are different. Polyamic acid solutions other than the polyamic acid solution to be in direct contact with the inorganic substrate may be polyimide solutions of which thermal imidization has been completed.

A plurality of polyamic acid solutions can be applied to the inorganic substrate using, for example, a two-layer die coater. By use of a multi-layer die coater or by sequential coating, a laminate of an inorganic substrate and a polymer film layer (polyimide film) having a multi-layer structure of two or more layers can be obtained.

With regard to application of the polyamic acid solution on the inorganic substrate in the present invention, the first layer may be applied on the inorganic substrate, then the solvent may be volatilized by heating at a temperature of 100° C. to 200° C. for 3 to 120 minutes, and the polyamic acid solution for the second layer may be applied thereon.

The laminate of an inorganic substrate and a polyimide film in the present invention may be finally formed into a laminate of an inorganic substrate and polyimide by applying a polyamic acid solution onto the inorganic substrate, then bonding a polyimide film thereto before heating, and then performing heating.

In order to obtain the laminate of an inorganic substrate and a polyimide film in the present invention, a polyamic acid solution applied on another support in a single layer or multiple layers in advance can be heated to form a self-supporting film, then the self-supporting film can be bonded to an inorganic substrate, and this can be heated.

The laminate of an inorganic substrate and a polyimide film in the present invention can also be obtained by bonding a polyamic acid heat-cured product that has been formed into a single-layer or multi-layer film in advance to an inorganic substrate. A single-layer or multi-layer polyimide film can be obtained by applying a polyamic acid solution onto a support such as a metal belt or resin film and drying the polyamic acid solution to form a self-supporting film, and then performing thermal imidization. The application of the polyamic acid solution on the support may be simultaneous multi-layer application, or a polyamic acid solution for the first layer may be applied and dried, then a polyamic acid solution may be applied thereon and dried, and imidization may be performed. When the polyamic acid solution is laminated in three or more layers as well, a multi-layer film can be obtained by repeating simultaneous or sequential application and heating similarly.

The laminate of the present invention can be fabricated, for example, according to the following procedure. The laminate can be obtained by treating at least one surface of the inorganic substrate with a silane coupling agent in advance, superposing the polyimide formed into a film on the surface treated with a silane coupling agent, and laminating the inorganic substrate and the polyimide by pressurization. The laminate can be obtained by treating at least one surface of the polyimide formed into a film with a silane coupling agent in advance, superposing the inorganic substrate on the surface treated with a silane coupling agent, and laminating the polyimide and the inorganic substrate by pressurization. Examples of the pressurization method include normal pressing or lamination in the atmosphere or pressing or lamination in a vacuum. Lamination in the atmosphere is desirable in the case of a laminate having a large size (for example, more than 200 mm) in order to obtain a stable peel strength over the entire surface. In contrast, pressing in a vacuum is preferable in the case of a laminate having a small size of about 200 mm or less. As the degree of vacuum, a degree of vacuum obtained by an ordinary oil-sealed rotary pump is sufficient, and about 10 Torr or less is sufficient. The pressure is preferably 1 MPa to 20 MPa, still more preferably 3 MPa to 10 MPa. The substrate may be destroyed when the pressure is high, and close contact may not be achieved at some portions when the pressure is low. The temperature is preferably 90° C. to 300° C., still more preferably 100° C. to 250° C. Polyimide may be damaged when the temperature is high, and the close contact force may be weak when the temperature is low.

The shape of the laminate is not particularly limited and may be square or rectangular. The shape of the laminate is preferably rectangular, and the length of the long side is preferably 300 mm or more, more preferably 500 mm or more, still more preferably 1000 mm or more. The upper limit is not particularly limited, but industrially, a length of 20000 mm or less is sufficient and the length may be 10000 mm or less. The diameter of the circumscribed circle of the inorganic substrate is preferably 310 mm or more. The diameter is more preferably 350 mm or more, still more preferably 400 mm or more since the laminate of the present invention can be packed in the form of a stack for storage and transportation when the laminate is large as well. Industrially, a diameter of 30,000 mm or less is sufficient, and the diameter may be 20,000 mm or less.

<Adhesive>

It is preferable that an adhesive layer is substantially not interposed between the inorganic substrate and polymer film layer of the present invention. Here, the adhesive layer in the present invention refers to a layer containing a Si (silicon) component at less than 10% as a mass ratio (less than 10% by mass). Substantially not used (not interposed) means that the thickness of the adhesive layer interposed between the inorganic substrate and the polymer film layer is preferably 0.4 μm or less, more preferably 0.3 μm or less, still more preferably 0.2 μm or less, particularly preferably 0.1 μm or less, most preferably 0 μm.

In the present invention, after the laminate of an inorganic substrate and a polymer film layer is fabricated, the first protective film is bonded to the surface of the polymer film layer. The first protective film may be detached and independent for every laminate of inorganic substrate/polymer film layer or may be continuous so that the laminates become a continuous sheet by the first protective film.

In the present invention, after the laminate of an inorganic substrate and a polymer film layer is fabricated, the second protective film may be bonded to the surface of the inorganic substrate on the opposite side to the polymer film layer. The second protective film may be detached and independent for every laminate of inorganic substrate/polymer film layer or may be continuous so that the laminates become a continuous sheet by the second protective film.

In other words, in a case where the first protective film and the second protective film are used simultaneously in the present invention, the following three patterns are conceivable.

(1) The first protective film and the second protective film are both detached for every laminate of inorganic substrate/polymer film layer.
(2) The laminate of inorganic substrate/polymer film layer is formed into a continuous sheet by the first protective film, and the second protective film is detached for every laminate of inorganic substrate/polymer film layer.
(3) The laminate of inorganic substrate/polymer film layer is formed into a continuous sheet by the second protective film, and the first protective film is detached for every laminate of inorganic substrate/polymer film layer.

The "continuous sheet" as used herein refers to a state in which two or more laminates of inorganic substrate/polymer film layer are connected by any of the continuous protective films.

The timing of bonding the first protective film and the second protective film to the inorganic substrate/polymer film layer may be simultaneous as illustrated in FIG. 1(b) or may be sequential. The order of bonding is not particularly limited, but it is preferable that the first protective film is bonded first from the viewpoint of protecting the surface of the polymer film layer.

In a case of using a polyamic acid heat-cured product (specifically, a polyimide film or the like) that has been cured in advance as a polymer film layer in the laminate, the first protective film and/or the second protective film may be bonded to the polyamic acid heat-cured product in advance. In that case, a laminate can be fabricated using a film that has been cut into sheets in advance, or a laminate sheet can be obtained by unwinding a long roll-shaped film, bonding the film to an inorganic substrate, and cutting the film before and after bonding. Even a laminate that has once been cut into sheets can be formed into a continuous sheet by bonding the first and/or second protective films thereto.

The surface roughness Ra of the surface of the second protective film substrate on the opposite side to the inorganic substrate in the second laminate of the present invention is preferably 0.02 μm or more, more preferably 0.025 μm or more, still more preferably 0.03 μm or more. The upper limit is preferably 1.2 μm or less, more preferably 0.6 μm or less, still more preferably 0.3 μm or less.

As a method for controlling the surface roughness of the protective film substrate within a predetermined range, a method in which the surface roughness is controlled by adding inorganic particles to the raw material resin during film fabrication of the protective film substrate can be exemplified. As the inorganic particles, a predetermined amount of known inorganic particles such as silica, alumina, calcia, magnesia, calcium carbonate, magnesium carbonate, calcium phosphate, magnesium phosphate, barium sulfate, talc and kaolin may be added. The amount added varies depending on the stretch ratio during fabrication of the substrate film, the final thickness of the substrate film, the particle size distribution of the added inorganic particles, and the like, but is generally 500 ppm or more, preferably 1000 ppm or more, more preferably 2000 ppm or more as a mass ratio to the mass of the substrate film resin, and the upper limit is 10% by mass or less, preferably 3% by mass or less, more preferably 10000 ppm or less.

As a method for controlling the surface roughness of the protective film substrate within a predetermined range, a method in which the surface of the film substrate is polished or ground to achieve a predetermined surface roughness can be exemplified.

As a method for controlling the surface roughness of the protective film substrate within a predetermined range, a method in which a protective film substrate is obtained by casting a film raw material on a support substrate fabricated in advance so as to have a predetermined surface roughness can be exemplified. In addition, a method in which the surface roughness of the protective film substrate is controlled by pressing an embossed roller processed into a predetermined surface shape, or the like can also be exemplified.

In the laminate of the present invention, the surface roughness of the surface of the first protective film on the opposite side to the polymer film layer is preferably 0.005 µm or more. The surface roughness is more preferably 0.01 µm or more. When the surface roughness of the surface of the first protective film on the opposite side to the polymer film layer is 0.005 µm or more, laminates can be easily taken out individually in a case where a plurality of laminates are stacked and stored for a long period of time as well if the surface roughness of the surface of the inorganic substrate on the opposite side to the polymer film layer or the surface of the second protective film on the opposite side to the inorganic substrate is within a predetermined range. The upper limit of the surface roughness is not particularly defined, but is preferably 1.2 µm or less, more preferably 1 µm or less since the first protective film and the second protective film are preferably formed of the same material.

In the first laminate of the present invention, the surface roughness Ra of the surface of the inorganic substrate on the opposite side to the polymer film layer is 0.02 µm to 1.2 µm. The surface roughness Ra is preferably 0.025 µm or more, more preferably 0.03 µm or more, still more preferably 0.05 µm or more since the laminates do not stick to the protective film surface and can be easily taken out individually in a case where a plurality of laminates are stacked and stored for a long period of time as well, and the handling properties are favorable. The surface roughness Ra is preferably 1.15 µm or less, more preferably 1.1 µm or less. As a method for controlling the surface roughness of the inorganic substrate within a predetermined range, a polishing method such as a shot blasting method or a wet blasting method can be used.

In the first laminate of the present invention, the dynamic friction coefficient between the surface of the first protective film on the opposite side to the polymer film layer and the surface of the inorganic substrate on the opposite side to the polymer film layer is preferably in a range of 0.02 to 0.25. The dynamic friction coefficient is preferably 0.05 to 0.24, more preferably 0.10 to 0.23 since the laminates do not stick to the protective film surface and can be easily taken out individually in a case where a plurality of the first laminates are stacked and stored for a long period of time as well, and the handling properties are still more favorable. The dynamic friction coefficient can be achieved by controlling the surface roughness of each of the surface of the first protective film on the opposite side to the polymer film layer and the surface of the inorganic substrate on the opposite side to the polymer film layer within the range described above.

In the second laminate of the present invention, the dynamic friction coefficient between the surface of the first protective film on the opposite side to the polymer film layer and the surface of the second protective film on the opposite side to the inorganic substrate is preferably in a range of 0.02 to 0.25. The dynamic friction coefficient is preferably 0.05 to 0.24, more preferably 0.10 to 0.23 since the laminates do not stick to the protective film surface and can be easily taken out individually in a case where a plurality of laminates are packed in a stacked state and stored for a long period of time as well, and the handling properties are still more favorable. The dynamic friction coefficient can be achieved by controlling the surface roughness of each of the surface of the first protective film on the opposite side to the polymer film layer and the surface of the second protective film on the opposite side to the inorganic substrate within the range described above.

In the second laminate of the present invention, the dynamic friction coefficient between the surfaces of the second protective films on the opposite side to the inorganic substrate is preferably in a range of 0.02 to 0.25. The dynamic friction coefficient is preferably 0.05 to 0.24, more preferably 0.10 to 0.23 since the laminates do not stick to the protective film surface and can be easily taken out individually in a case where a plurality of laminates are packed in a stacked state and stored for a long period of time as well, and the handling properties are still more favorable. The dynamic friction coefficient can be achieved by controlling the surface roughness of the surface of the second protective film on the opposite side to the inorganic substrate within the range described above.

In the present invention, a plurality of laminates described above, preferably four or more laminates, more preferably ten or more laminates can be superposed one on another to form a stack. In the case of superposing the laminates, the directions of the laminates may be the same or different, but is preferably the same. In the present invention, since the dynamic friction coefficient between the surfaces in contact with each other is within a predetermined range in the case where the laminates are stacked, it is possible to easily take out the laminates from the stack individually. As for the laminates to be stacked, only laminates of the same type may be used, or laminates of different types may be randomly used. It is preferable that only laminates of the same type are used for stacking, and preferred aspects include a case where only a plurality of the first laminates are stacked and a case where only a plurality of the second laminates are stacked.

In the present invention, the laminate can be stored in the stacked state thus obtained. In the case of storing the laminate, it is preferable to pack the laminate in the stacked state. The stack of the present invention can be stored so that the inorganic substrates of the stack are oriented horizontally, are oriented vertically, or are oriented almost vertically, that is, are tilted at about 75 to 89 degrees.

In the present invention, the laminate can be transported in the stacked state thus obtained. In the case of transporting the laminate, it is preferable to pack the laminate in the stacked state. The stack of the present invention can be held and transported so that the inorganic substrates of the stack are oriented horizontally, so that the stack is oriented vertically, or so that the inorganic substrates of the stack are oriented almost vertically, that is. are in a state of being tilted at about 75 to 89 degrees.

Examples

Hereinafter, the present invention will be described more specifically with reference to Examples, but the present invention is not limited to the following Examples. The evaluation methods of physical properties in the following Examples are as follows.

<Surface Roughness>

The surface roughness Ra was measured using a stylus surface roughness meter in conformity with ISO 25178-2: 2012.

<Dynamic Friction Coefficient>

The dynamic friction coefficient was measured by attaching a friction coefficient jig to a tensile tester in conformity with JIS K 7125:1999.

Tensile tester: "Autograph (registered trademark) AG-IS" manufactured by Shimadzu Corporation <Preparation of Polyimide Solution A1>

While nitrogen gas was introduced into a reaction vessel equipped with a nitrogen introducing tube, a Dean-Stark tube and a reflux tube, a thermometer, and a stirring bar, 19.86 parts by mass of 4,4'-diaminodiphenyl sulfone (4,4'-DDS), 4.97 parts by mass of 3,3'-diaminodiphenyl sulfone (3,3'-DDS), and 80 parts by mass of γ-butyrolactone (GBL) were added. Subsequently, 31.02 parts by mass of 4,4'-oxydiphthalic dianhydride (ODPA), 24 parts by mass of GBL, and 13 parts by mass of toluene were added at room temperature, then the temperature was raised to an internal temperature of 160° C., and the mixture was heated under reflux at 160° C. for 1 hour for imidization. After the imidization was completed, the temperature was raised to 180° C., and the reaction was continuously conducted while extracting toluene. After the reaction for 12 hours, the oil bath was removed, the temperature was returned to room temperature, and GBL was added so that the solid concentration was 20% by mass, thereby obtaining a polyimide solution A1 having a reduced viscosity of 0.70 dl/g.

<Preparation of Polyamic Acid Solution B1>

The interior of a reaction vessel equipped with a nitrogen introducing tube, a reflux tube, and a stirring bar was purged with nitrogen, and then 33.36 parts by mass of 2,2'-bis (trifluoromethyl)benzidine (TFMB) was completely dissolved in 270.37 parts by mass of dimethylacetamide (DMAc). Subsequently, 9.81 parts by mass of 1,2,3,4-cyclobutanetetracarboxylic dianhydride (CBDA), 11.34 parts by mass of 3,3',4,4'-biphenyltetracarboxylic acid, and 4.85 parts by mass of (ODPA) were each added dividedly in the solid form, and the mixture was stirred at room temperature for 24 hours. Thereafter, 165.7 parts by mass of DMAc was added for dilution, thereby obtaining a polyamic acid solution B1 having a solid content of 18% by mass and a reduced viscosity of 2.7 dl/g (CBDA/BPDA/ODPA/TFMB=0.48/0.37/0.15/1.00 (molar ratio)).

<Preparation of Polyamic Acid Solution B2>

The inside of a reaction vessel equipped with a nitrogen introducing tube, a reflux tube, and a stirring bar was purged with nitrogen, then 22.73 parts by mass of 4,4'-diaminobenzanilide (DABAN), 201.1 parts by mass of N,N-dimethylacetamide (DMAc), and a dispersion obtained by dispersing colloidal silica (lubricant) in dimethylacetamide ("SNOWTEX (registered trademark) DMAC-ST-ZL" manufactured by Nissan Chemical Corporation) were added so that silica (lubricant) was 0.4% by mass of the total amount of polymer solids in the polyamic acid solution, and completely dissolved. Subsequently, 22.73 parts by mass of 3,3',4,4'-biphenyltetracarboxylic dianhydride (BPDA) was added dividedly in the solid form, and the mixture was then stirred at room temperature for 24 hours. Thereafter, 173.1 parts by mass of DMAc was added for dilution, thereby obtaining a polyamic acid solution B2 having a solid content (NV) of 12% by mass and a reduced viscosity (rsp/C) of 3.10 dl/g.

<Preparation of Protective Film Substrate>

The following was used as a protective film substrate.
E5100 manufactured by TOYOBO CO., LTD., sand mat treatment on one surface, PET film, thickness 25 μm
TORAYFAN (registered trademark) manufactured by TORAY INDUSTRIES, INC., corona treatment on one surface, polypropylene film, thickness 26 μm
COSMOSHINE (registered trademark) manufactured by TOYOBO CO., LTD, PET film, thickness 100 μm <Preparation of Pressure Sensitive Adhesive Layer and Fabrication of Protective Film>

While 100 parts by mass of urethane-based solvent type pressure sensitive adhesive US-902-50 (manufactured by Lion Specialty Chemicals Co., Ltd., ethyl acetate solvent, solid content: 50%) was stirred, 5.4 parts by mass of a crosslinking agent (manufactured by Lion Specialty Chemicals Co., Ltd.) and 2 parts by mass of an ultraviolet absorber (Cyasorb UV-3638 (manufactured by CYTEC)) were added, and the reaction was conducted at 40° C. for 20 minutes. The obtained solution was filtered through a PTFE cartridge filter (0.45 μm) and then applied onto a protective film substrate so that the final film thickness was 10 pam, and heating was performed at 100° C. for 2 minutes to obtain a protective film. E5100 (pressure sensitive adhesive coating on surface not undergone sand mat treatment) was used as the substrate for PF1, TORAYFAN for PF2, and COSMOSHINE for PF3.

<Fabrication of Laminate L1>

The polyimide solution A1 was cast on a rectangular alkali-free glass S1 (one prepared by subjecting the non-coated surface of OA11G manufactured by NEG to wet blasting treatment) of 500 mm×400 mm (diameter of circumscribed circle: 640.3 mm) and 0.7 mm thick using a bar coater so that the dry thickness was 15 pam, and dried in a hot air oven at 110° C. for 1 hour. The laminate of glass and a dried product of polyamic acid solution thus obtained was gradually heated to 330° C. at a rate of 5° C./min and further heated for 10 minutes to evaporate the solvent, whereby a laminate of a polyimide film having a thickness of about 15 μm and an alkali-free glass plate was obtained. The protective film PF1 (pressure sensitive adhesive-coated surface) was bonded to the polyimide film surface to obtain a laminate L1 of a polyimide film and an alkali-free glass plate with attached first protective film.

<Fabrication of Laminate L2>

The polyamic acid solution B1 was cast on a rectangular alkali-free glass (one prepared by subjecting the non-coated surface of OA11G manufactured by NEG to wet blasting treatment) of 500 mm×400 mm and 0.7 mm thick using a bar coater so that the dry thickness was 15 pam, and dried in a hot air oven at 100° C. for 1 hour. The laminate of glass and a dried product of polyamic acid solution thus obtained was gradually heated to 350° C. at a rate of 5° C./min and further heated for 10 minutes for imidization, whereby a laminate of a polyimide film having a thickness of about 15 μm and an alkali-free glass plate was obtained. The protective film PF1 (pressure sensitive adhesive-coated surface) was bonded to the polyimide film surface to obtain a laminate L2 of a polyimide film and an alkali-free glass plate with attached first protective film.

<Fabrication of Laminate L3>

Figure 5:
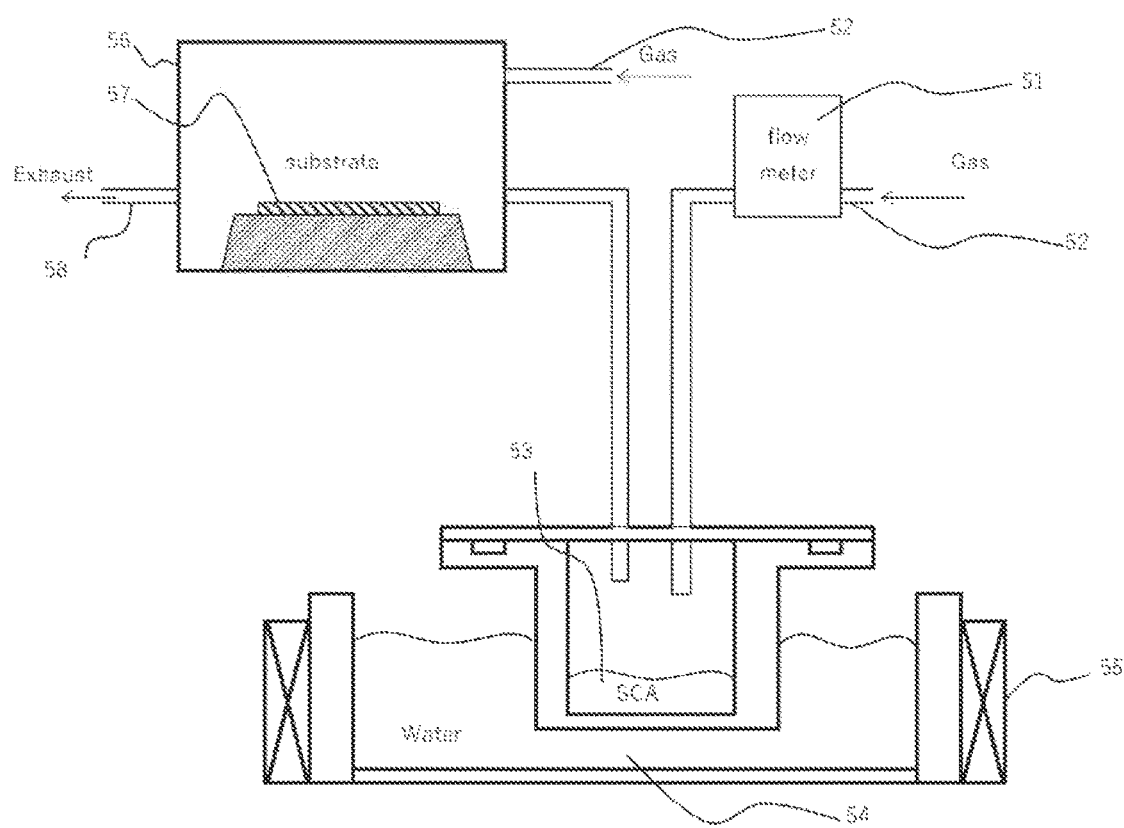
FIG. 5 is a schematic diagram for explaining a method for applying a silane coupling agent according to the present patent.

A silane coupling agent was applied to a glass plate, a polyimide film was laminated thereon, and heating was performed to obtain a laminate of a polyimide film and glass. First, the method for applying a silane coupling agent to a glass substrate was carried out using the apparatus illustrated in FIG. 5. FIG. 5 is a schematic diagram of an apparatus for applying a silane coupling agent to a glass substrate. As the glass substrate, one prepared by subjecting the surface not coated with a silane coupling agent of OA11G glass (manufactured by NEG) having a thickness of 0.7 mm and cut into a size of 500 mm×400 mm to wet blasting treatment was used. The glass substrate used was cleaned with pure water for 2 minutes in an ultrasonic cleaner and then water was removed therefrom with an air knife. Into a chemical tank having a capacity of 1 L, 150 g of 3-aminopropyltrimethoxysilane (silane coupling agent, Shin-Etsu Chemical KBM903) was put, and the outer water bath of this chemical tank was warmed to 43° C. The vapor that came out was then sent to the chamber together with clean dry air. The gas flow rate was set to 25 L/min and the substrate temperature was set to 24° C. The temperature of clean dry air was 23° C. and the humidity thereof was 1.2% RH. Since the exhaust is connected to the exhaust port having a negative pressure, it is confirmed that the chamber has a negative pressure of about 2 Pa by a differential pressure gauge.

Next, UPILEX (registered trademark) 25S (size of 450 mm×450 mm) manufactured by UBE Corporation as a polymer film layer was bonded on the silane coupling agent layer to obtain a laminate. Laminator MRK650Y manufactured by MCK CO., LTD. was used for bonding, and the bonding conditions were set to compressed air pressure: 0.6 MPa, temperature: 22° C., humidity: 55% RH, and lamination speed: 50 mm/sec. This polyimide film/glass laminate was heated at 200° C. for 30 minutes to obtain a laminate of a polyimide film and an alkali-free glass plate. The protective film PF1 (pressure sensitive adhesive-coated surface) was bonded to the polyimide film surface to obtain a laminate L3 of a polyimide film and an alkali-free glass plate with attached first protective film.

<Fabrication of Laminate L4>

A laminate of a polyimide film and glass with attached first protective film was obtained in the same manner as the laminate L3 except that XENOMAX (registered trademark) F15LR2 manufactured by TOYOBO CO., LTD. was used as a polyimide film. The protective film PF1 was bonded to the surface of the glass on the opposite side to the polyimide film to obtain a laminate L4 of a polyimide film and an alkali-free glass plate with first and second protective films.

<Fabrication of Laminate L5>

The polyamic acid solution B2 was cast on a rectangular alkali-free glass S2 (OA11G manufactured by NEG) of 500 mm×400 mm and 0.7 mm thick using a bar coater so that the dry thickness was 15 μm, and dried in a hot air oven at 100° C. for 1 hour. The laminate of glass and a dried product of polyamic acid solution thus obtained was gradually heated to 350° C. at a rate of 5° C./min and further heated for 10 minutes for imidization, whereby a laminate of a polyimide film having a thickness of about 15 μm and an alkali-free glass plate was obtained. The protective film PF1 (pressure sensitive adhesive-coated surface) was bonded to the polyimide film surface to obtain a laminate of a polyimide film and an alkali-free glass plate with attached first protective film. The protective film PF1 (pressure sensitive adhesive-coated surface) was bonded to the surface of the glass on the opposite side to the polyimide film to obtain a laminate L5 of a polyimide film and an alkali-free glass plate with first and second protective films.

<Fabrication of Laminate L6>

The polyimide solution A1 was cast on a rectangular alkali-free glass (OA11G manufactured by NEG) of 500 mm×400 mm and 0.7 mm thick using a bar coater so that the dry thickness was 15 μm, and dried in a hot air oven at 110° C. for 1 hour. The laminate of glass and a dried product of polyamic acid solution thus obtained was gradually heated to 300° C. at a rate of 5° C./min and further heated for 10 minutes to evaporate the solvent, whereby a laminate of a polyimide film having a thickness of about 15 μm and an alkali-free glass plate was obtained. The protective film PF1 (pressure sensitive adhesive-coated surface) was bonded to the polyimide film surface to obtain a laminate of a polyimide film and an alkali-free glass plate with attached first protective film. The protective film PF2 was bonded to the surface of the glass on the opposite side to the polyimide film to obtain a laminate L6 of a polyimide film heat-cured product and an alkali-free glass plate with first and second protective films.

<Fabrication of Laminate L7>

A laminate L7 of a polyimide film and an alkali-free glass plate with attached first protective film was obtained in the same manner as the laminate L4 except that the glass was not subjected to wet blasting treatment and the second protective film was not used.

<Fabrication of Laminate L8>

A laminate L8 of a polyimide film and an alkali-free glass plate with attached first protective film was obtained in the same manner as the laminate L1 except that the glass was not subjected to wet blasting treatment.

<Fabrication of Laminate L9>

A laminate L9 of a polyimide film and an alkali-free glass plate with first and second protective films was obtained in the same manner as the laminate L3 except that the glass was not subjected to wet blasting treatment and PF3 was used as the second protective film.

<Evaluation of Handling Properties of Laminate Stack>

Ten sets of laminates were stacked horizontally on a flat tabletop with the glass plate facing downward to form a stack of laminates, a glass plate of the same size, a polyethylene film having a thickness of 50 pam, and a silicone rubber sheet having the same size as the glass plate and a thickness of 3 mm were stacked thereon, and a stainless plate having a thickness of 10 mm as a weight was further placed thereon, and the stack was left to stand at room temperature for 10 days.

After 10 days, the weight, silicone rubber sheet, and polyethylene film were removed, and it was examined whether it was possible to manually take out the laminates one set by one set from the laminate stack in which 10 sets of laminates were laminated. As a result, the handling properties were evaluated as "○" in a case where the laminate was taken out without any particular problem, and as "x" in a case where some problems occurred when the laminate was taken out. The results are presented in Table 1.

Most of the cases exhibiting poor handling properties were such that the back surface of the glass plate and the protective film were in close contact with each other and the protective film of the lower set peeled off when the glass plate was lifted.

TABLE 1

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Laminate | L1 | L2 | L3 | L4 | L5 | L6 | L7 | L8 | L9 |
| First protective film | PF1 | PF1 | PF1 | PF1 | PF1 | PF1 | PF1 | PF1 | PF1 |
| Inorganic substrate | S1 | S1 | S1 | S1 | S2 | S2 | S2 | S2 | S2 |
| Glass | OA11G | OA11G | OA11G | OA11G | OA11G | OA11G | OA11G | OA11G | OA11G |
| Wet blasting treatment on one surface | Presence | Presence | Presence | Presence | Absence | Absence | Absence | Absence | Absence |
| Polymer film layer | A1 | B1 | UPILEX | XENOMAX | B2 | A1 | XENOMAX | A1 | UPILEX |
| Ra of inorganic substrate ($\mu$m)*1 | 1 | 1.1 | 1 | 1.1 | 0.0007 | 0.0007 | 0.0007 | 0.0007 | 0.0007 |
| Second protective film | Absence | Absence | Absence | PF1 | PF1 | PF2 | Absence | Absence | PF3 |
| Ra of second protective film ($\mu$m)*2 | — | — | — | 0.037 | 0.037 | 0.12 | — | — | 0.003 |
| Dynamic friction coefficient between inorganic substrate and first protective film*3 | 0.23 | 0.23 | 0.23 | 0.15 | 0.15 | 0.12 | 0.75 | 0.75 | 0.61 |
| Dynamic friction coefficient between first protective film and second protective film*4 | — | — | — | 0.12 | 0.11 | 0.1 | — | — | 0.42 |
| Dynamic friction coefficient between second protective films*5 | — | — | — | 0.13 | 0.13 | 0.06 | — | — | 0.72 |
| Handling properties of laminate stack | ○ | ○ | ○ | ○ | ○ | ○ | X | X | X |

*1Value for surface on opposite side to polymer film layer
*2Value for surface on opposite side to inorganic substrate
*3Value for surface on opposite side to polymer film layer
*4Value for surface of first protective film on opposite side to polymer film layer and value for surface of second protective film on opposite side to inorganic substrate
*5Value for surface on opposite side to inorganic substrate <Evaluation of Suitability for Transportation of Laminate Stack>

In the combination of laminates that were considered to exhibit favorable handling properties in the evaluation of handling properties, 10 sets of each were stacked together to obtain a stack of laminates. The laminate stack was wrapped with kraft paper, put in a plastic case with a 20 mm thick polyurethane cushion, loaded on the bed of a small truck, and transported for 30 km along a national highway. At the destination, the package was unpacked and the handling properties were re-evaluated by the method described above.

In any combination, the laminates could be taken out without any particular problem. There were no accidents such as broken glass during transportation.

INDUSTRIAL APPLICABILITY

As described above, the laminate of an inorganic substrate and a polymer film layer of the present invention is excellent in handleability and transportability, can be handled in a state where the polymer film surface is protected by the protective film, and further the protective film can be peeled off without any problem in a case where processing is performed on the polymer film surface.

The present invention can be usefully utilized for manufacture of flexible devices and the like in which microfabrication is performed on the polymer film using such a laminate and then the polymer film is peeled off from the inorganic substrate.

DESCRIPTION OF REFERENCE SIGNS

11 Polyamic acid solution
12, 21, 32, 41 Inorganic substrate
13 Lamination roller
14, 23, 33, 43 First protective film
15, 22, 31, 42 Polymer film layer
16, 34, 44 Second protective film
51 Flow meter
52 Gas inlet
53 Chemical tank (silane coupling agent tank)
54 Hot water tank (water bath)
55 Heater
56 Processing chamber (chamber)
57 Substrate
58 Exhaust port

The invention claimed is:

1. A laminate comprising an inorganic substrate, a polymer film layer, and a protective film in this order, wherein a surface of the inorganic substrate on an opposite side to the polymer film layer has a surface roughness Ra of 0.02 $\mu$m to 1.2 $\mu$m, and two or more laminates of the inorganic substrate and the polymer film layer are linked by the protective film.

2. The laminate according to claim 1, wherein a dynamic friction coefficient between a surface of the protective film on an opposite side to the polymer film layer and a surface of the inorganic substrate on an opposite side to the polymer film layer is in a range of 0.02 to 0.25.

3. A laminate comprising a second protective film, an inorganic substrate, a polymer film layer, and a first protective film in this order, wherein
a surface of the second protective film on an opposite side to the inorganic substrate has a surface roughness Ra of 0.02 $\mu$m to 1.2 $\mu$m, and
either (a) a laminate of the inorganic substrate and the polymer film layer is formed into a continuous sheet by the first protective film, and the second protective film is detached for every laminate of the inorganic substrate and the polymer film layer, or (b) a laminate of the inorganic substrate and the polymer film layer is formed into a continuous sheet by the second protective film, and the first protective film is detached for every laminate of the inorganic substrate/the polymer film layer.

4. The laminate according to claim 3, wherein a dynamic friction coefficient between a surface of the first protective film on an opposite side to the polymer film layer and a surface of the second protective film on an opposite side to the inorganic substrate is in a range of 0.02 to 0.25.

5. The laminate according to claim 3, wherein a dynamic friction coefficient between surfaces of the second protective films on an opposite side to the inorganic substrate is in a range of 0.02 to 0.25.

6. The laminate according to claim 1, wherein a diameter of a circumscribed circle of the inorganic substrate is 310 mm or more.

7. A laminate stack comprising four or more laminates according to claim 1 stacked in a same layer direction.

8. A laminate storage method comprising storing a laminate in a form of the laminate stack according to claim 7.

9. A laminate transport method comprising transporting a laminate in a form of the laminate stack according to claim 7.

10. The laminate according to claim 3, wherein a diameter of a circumscribed circle of the inorganic substrate is 310 mm or more.

11. A laminate stack comprising four or more laminates according to claim 3, stacked in a same layer direction.

12. A laminate storage method comprising storing a laminate in a form of the laminate stack according to claim 11.

13. A laminate transport method comprising transporting a laminate in a form of the laminate stack according to claim 11.

14. The laminate according to claim 1, wherein the polymer film layer has a haze of 0.01 or more and 1.0 or less.

15. The laminate according to claim 1, wherein the polymer film layer has a melting point of 250° C. or more and 500° C. or less.

16. The laminate according to claim 3, wherein the polymer film layer has a haze of 0.01 or more and 1.0 or less.

17. The laminate according to claim 3, wherein the polymer film layer has a melting point of 250° C. or more and 500° C. or less.

* * * * *